United States Patent [19]
Lischvnsky et al.

[11] Patent Number: 5,865,332
[45] Date of Patent: Feb. 2, 1999

[54] ENVIRONMENTAL PROTECTION HOUSING

[75] Inventors: Steve J. Lischvnsky, Ottawa; Richard P. Hughes; Seaho Song, both of Kanata, all of Canada

[73] Assignee: Northern Telecom Limited, Montreal, Canada

[21] Appl. No.: 66,590

[22] Filed: Apr. 27, 1998

[51] Int. Cl.⁶ .................................................. B65D 43/20
[52] U.S. Cl. ..................................... 220/4.02; 220/345.4
[58] Field of Search ................................. 220/4.02, 4.04, 220/4.07, 4.21, 203.09, 279, 315, 345.4

[56] References Cited

U.S. PATENT DOCUMENTS

| | | | |
|---|---|---|---|
| 575,621 | 1/1897 | Smith | 220/345.4 |
| 1,343,480 | 6/1920 | Rutherford | 220/345.4 |
| 1,396,719 | 11/1921 | Hull | 220/345.4 |
| 5,190,182 | 3/1993 | Copas et al. | 220/345.6 |
| 5,620,109 | 4/1997 | Madden | 220/345.4 |

*Primary Examiner*—Joseph M. Moy
*Attorney, Agent, or Firm*—Angela C. de Wilton

[57] ABSTRACT

An environmental protection housing for an optical fiber connector having two housing parts to define an environmentally protected chamber to house the connector. The housing is for use for housing a connector upon suspended cable. So as to prevent the weight of the cable being taken by the connector when the housing parts are separated, a movement limiting device is provided an which extends between the housing members. This movement limiting device comprises an elongate rigid member which is capable of preventing relative rotation or change in relative orientation of the housing parts while the rigid member extends between the housing parts. With the connector uncoupled and thus the danger of the loading of the cable being taken upon the connector in coupled condition, the connector is releasable from one or both of the housing parts.

10 Claims, 6 Drawing Sheets

ENVIRONMENTAL PROTECTION HOUSING

This invention relates to environmental protection housings for optical fiber connectors.

The modern use of optical fibers has necessitated designs of optical connectors to join succeeding lengths of fiber together. For indoor use, it is conventional to place such connectors in housings such as fiber excess length storage cabinets and optical fiber organizers. For outside use, specially designed environmental protection housings need to be manufactured to protect optical connectors from hostile environments such as corrosive atmospheric conditions, high humidity and water intrusion and also from the effects of sand and dust.

While such environmental protection housings may be effective in use for their desired protection qualities, one problem which remains relates to situations where housings are not directly mounted upon a carrier or support, but instead the housings are carried by optical cables which hold the housings suspended above ground level. In such situations, when maintenance procedures are required to be performed upon a connector, it is necessary to disassemble the housing to enable the connector to be reached before two parts of the connector can be separated. After disassembly of the housing, the full weight of the suspended cable extending between supports and the full weight of the housing is immediately taken by the assembled connector, unless the maintenance engineer is able to control this weight himself and also control the positions of the housing parts on their respective cables. Such control is difficult to achieve and maintain during connector disassembly and similar problems are found during assembly of such connectors. If the engineer fails to control this weight and allows it to be taken upon the assembled connector, then breakage of the connector may result. The load imposed upon the connector may be applied as a tensional, torsional or bending load, or a combination of any of these types of loading.

The present invention seeks to provide an environmental protection housing which will overcome or minimize the above problems.

Accordingly, the present invention provides an environmental protection housing for an optical fiber connector, the housing comprising two housing parts which are connectable together to define an environmentally protected chamber to house the optical fiber connector, each housing part having an inlet into the chamber for receiving an optical fiber, and a movement limiting device comprising an elongate rigid member which, during separation of the housing parts, extends from one housing part to the other to permit partial separation of the housing parts only and sufficient to enable access to the connector within the chamber to permit the connector to be disassembled, the rigid member being capable of preventing significant relative rotation or change in relative orientation of the housing parts, the movement limiting device also comprising a release element which is operable to allow for complete separation of the housing parts.

Hence, with the housing according to the invention, the connector within the housing may be coupled or uncoupled with the housing parts separated a limited distance apart to provide access to the connector. This is made possible while ensuring that the housing parts are not allowed to move relative to one another so as to restrain the cable from moving between the housing parts and direct loads from the cable into the housing parts and through the movement limiting device. This diversion of the loads of the cable prevents the loads being taken directly by a coupled connector so that damage to or breakage of the connector is prevented.

In one practical arrangement, the rigid member is basically of planar elongate form and has one end region slideably receivable through a complimentarily shaped orifice in a wall of one of the housing parts. The release element is carried by the end region of the rigid member so as to abut the wall of the housing as the rigid member slides through the orifice during partial separation of the housing parts. The release member upon being operated to allow for complete separation of the housing parts, is permitted to pass through the orifice for complete separation of the housing parts.

In addition, the other end region of the rigid member may have another release element attached to it to enable that end to be slideably received within an orifice of a wall of the other housing part and so as to allow the rigid member to be released therefrom also. With this arrangement the movement limiting device may be completely disconnected from both housing parts which is convenient for storage purposes.

In an alternative arrangement, the rigid member has a release element attached to one end region only and the other end region of the rigid member is secured to the other housing part.

In a preferred arrangement, the or each release element comprises a latch which is normally urged by resilient means into a holding position in which it abuts a wall of a respective housing part so as to permit only partial separation of the housing parts. This latch is pivotally moveable to a release position in which it allows for a complete separation of the housing parts. Conveniently, the resilient means comprises a tension spring which causes the latch to be rotationally held in its holding position.

So as to provide extreme rigidity to the rigid member, the rigid member has at least one elongate lateral stiffening element which extends longitudinally of the rigid member. In the case where the rigid member is of basic planar form, this stiffening element extends outwards from the plane of the member.

It is also convenient for the movement limiting device to have stop means to limit pivotal movement of the latch at its release position.

Embodiments of the invention will now be described, by way of example, with reference to the accompanying drawings, in which.

Figure 1:
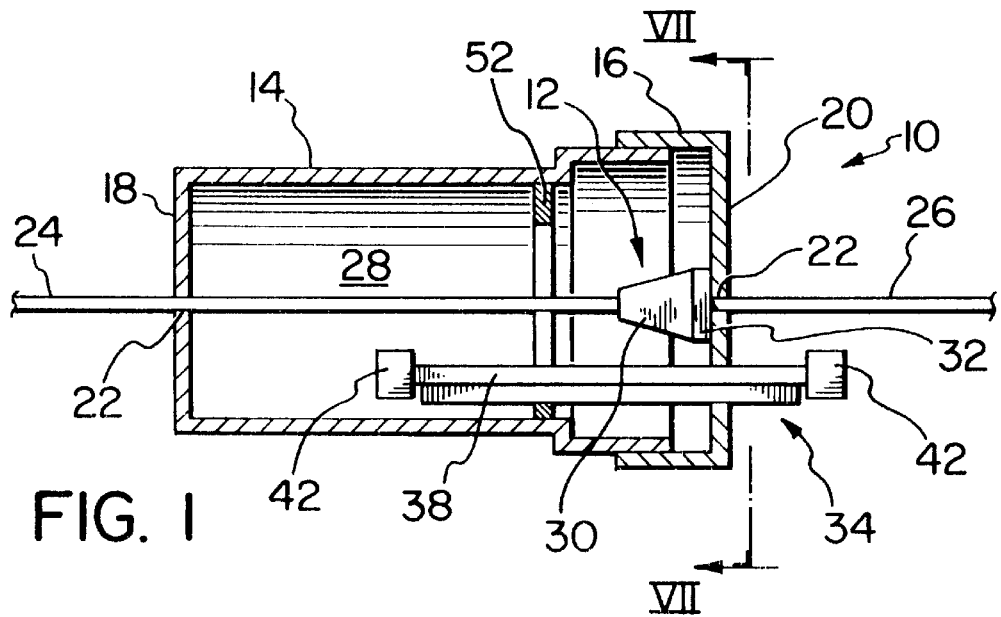
FIG. 1 is a longitudinal cross-sectional view through an environmental protection housing according to a first embodiment and fitted to a suspended cable in a closed condition.
Figure 2:
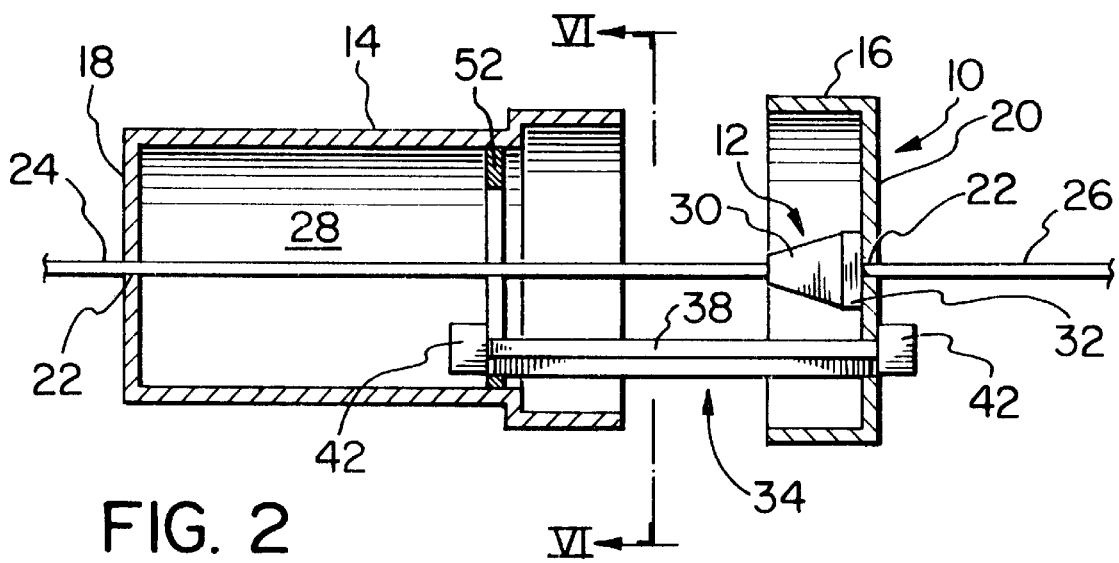
FIG. 2 is a view similar to FIG. 1, but showing the housing in a partially separated condition.
Figure 3:
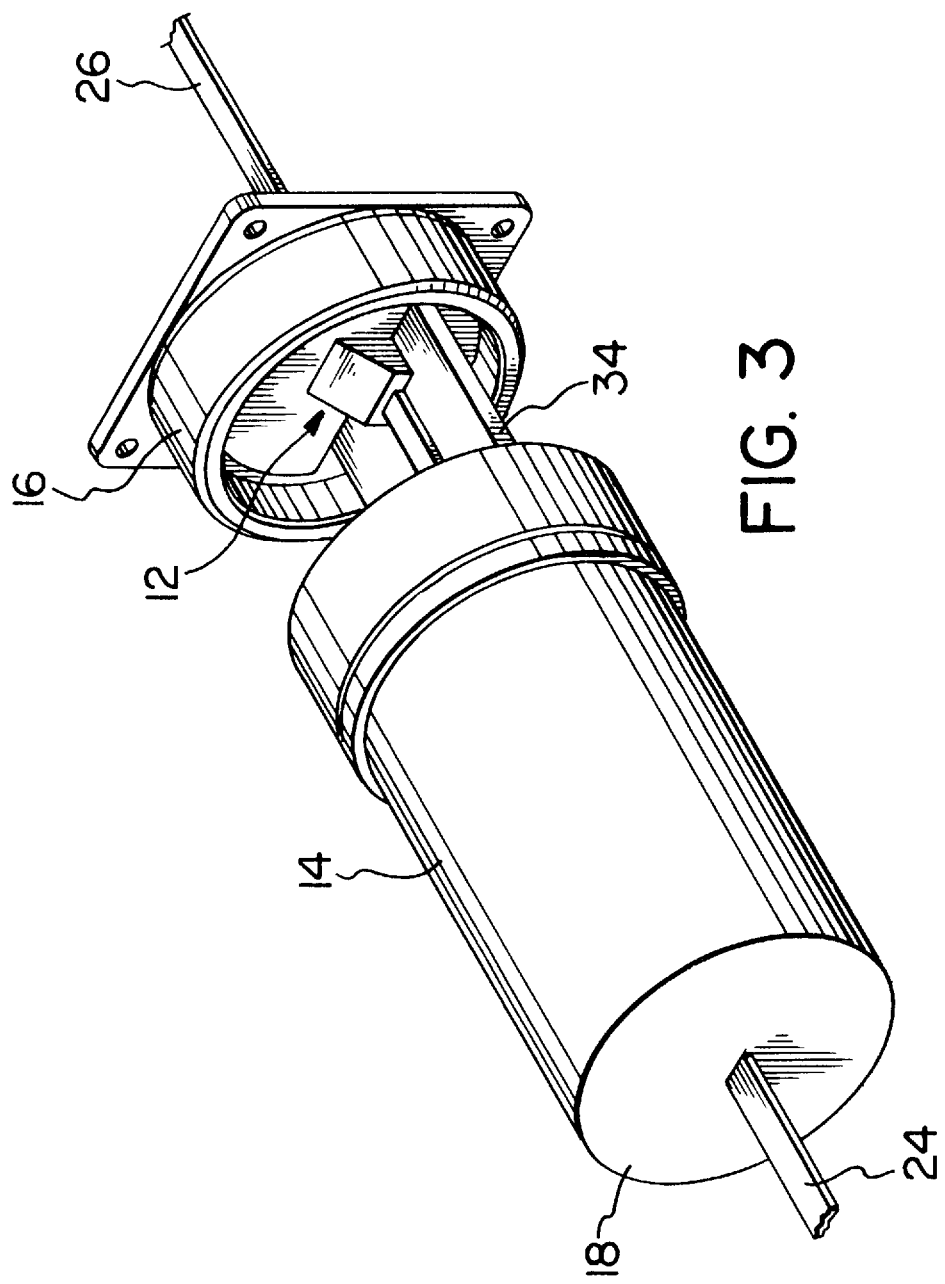
FIG. 3 is an isometric view of the housing in the partially separated condition of FIG. 2.
Figure 9:
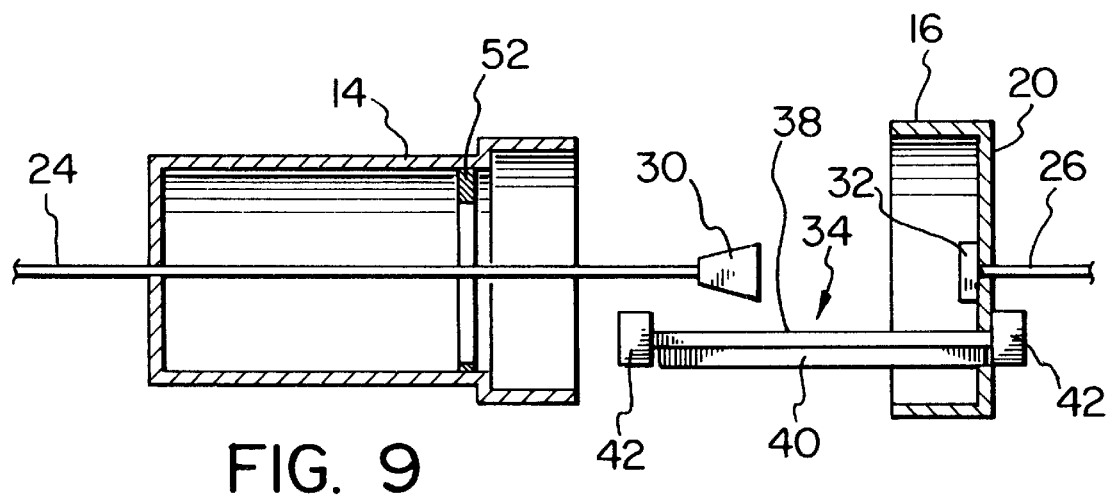
FIG. 9 is a view similar to FIGS. 1 and 2 and showing the housing parts of the first embodiment completely separated and an optical connector uncoupled.

In a first embodiment as shown by FIGS. 1 and 2, an environmental protection housing 10 for an optical fiber connector 12 comprises two housing parts 14 and 16 lo which are basically of circular shape in cross-section as shown by FIG. 3. These housing parts are connectable together to form an assembly as shown in FIG. 1 or may be disconnected, for instance as shown by FIGS. 2 and 9. To assemble and disassemble the housing parts, it is essential that non-rotational assembly methods are used for reasons which will become apparent below. The housing parts 14 and 16 are assembled together and sealed in conventional manner.

The housing parts 14 and 16 have end walls 18 and 20 respectively. The end walls 18 and 20 are provided with concentric apertures 22 for passage of cable lengths 24 and 26 through the end walls and into an environmentally protected chamber 28 formed within the assembled housing. The cable lengths 24 and 26 are connected, respectively, to connector parts 30 and 32 of the connector 12. The cable lengths are sealed in the apertures 22 and the connector part 32 is mounted upon the wall 20 of housing part 16.

It follows that in the assembled condition, the housing parts are sealed together as shown in FIG. 1 with the cable lengths 24 and 26 connected into the connector parts 30 and 32 which are also assembled. Upon requiring access to the connector 12 for maintenance or replacement purposes, it is necessary to separate the housing parts 14 and 16. In a conventional construction upon disassembly of the housing parts, a problem which would exist would be that the weights of the suspended cable between vertical supports, i.e. on each side of the housing, would be taken fully upon the connector which could result in breakage or damage thereto. With conventional arrangements, it could be extremely difficult to direct a cable load away from the connector by supporting it by some other means to avoid such damage or breakage.

Figure 4:
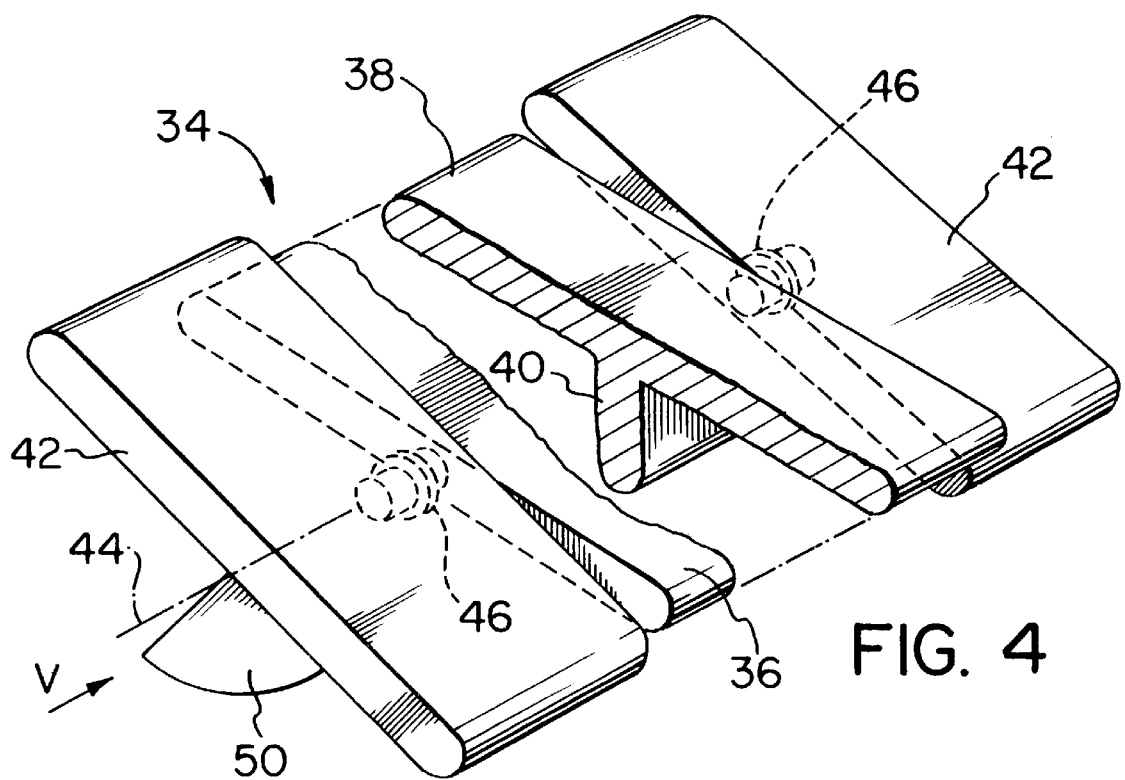
FIG. 4 is an isometric view of a movement limiting device of the housing of the first embodiment and to a larger scale.
Figure 5:
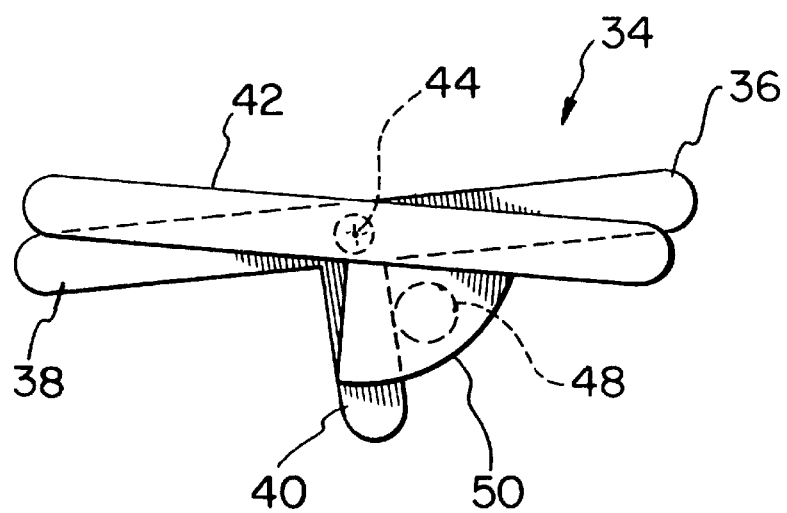
FIG. 5 is an end view of the movement limiting device in the direction of arrow V in FIG. 4.
Figure 8:
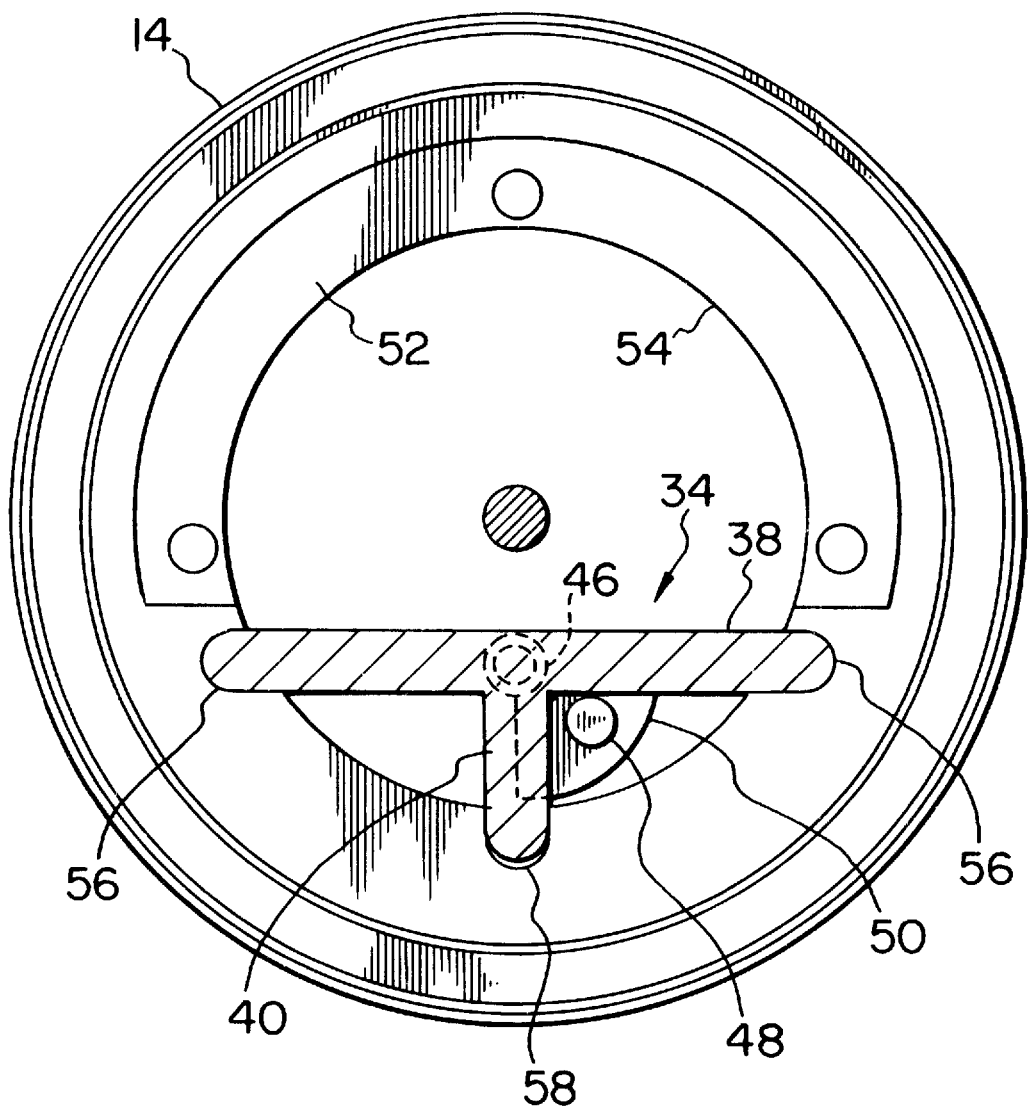
FIG. 8 is a view similar to FIG. 6 and showing the movement limiting device in a different position from that in FIG. 6.

The present invention, as shown in this embodiment as will now be described, avoids the above problem. With the embodiment the housing 10 also includes a movement limiting device 34 which, as shown in FIGS. 1 and 2, extends between the housing parts 14 and 16. This movement limiting device comprises, and as shown in greater detail in FIGS. 4 and 5, a rigid polymeric or metal member 36 which has a planar elongate main portion 38 from which depends an integral elongate lateral stiffening element 40. At each end of the rigid member 36 is provided a release element in the form of a latch 42 which is basically of the same cross-sectional shape as the main portion 38. Each latch 42 is centrally pivoted about a pivotal axis 44 coincident with the longitudinal axis of the main portion 38 and is urged into a normal position in which the latch is tilted relative to the main portion 38 by resilient means comprising a torsion spring 46 mounted between the latch and the main portion. Each latch is pivotally moveable out of its normal position and into a position in which it lies coplanar with the main portion 38 of the rigid member and as shown by FIG. 8. The movement into its position in FIG. 8 is of course pivotal and is against the action of the spring 46. Each latch is limited in its pivotal movement between its two positions by stop means comprising a stop peg 48 which is provided upon a downward segmentally shaped projection 50 of the latch. The stop peg engages a side of the stiffening element 40 in one pivotal position of the latch (FIG. 6) and the undersurface of the main portion 38 of the rigid member 36 in the other position (FIG. 8).

Figure 6:
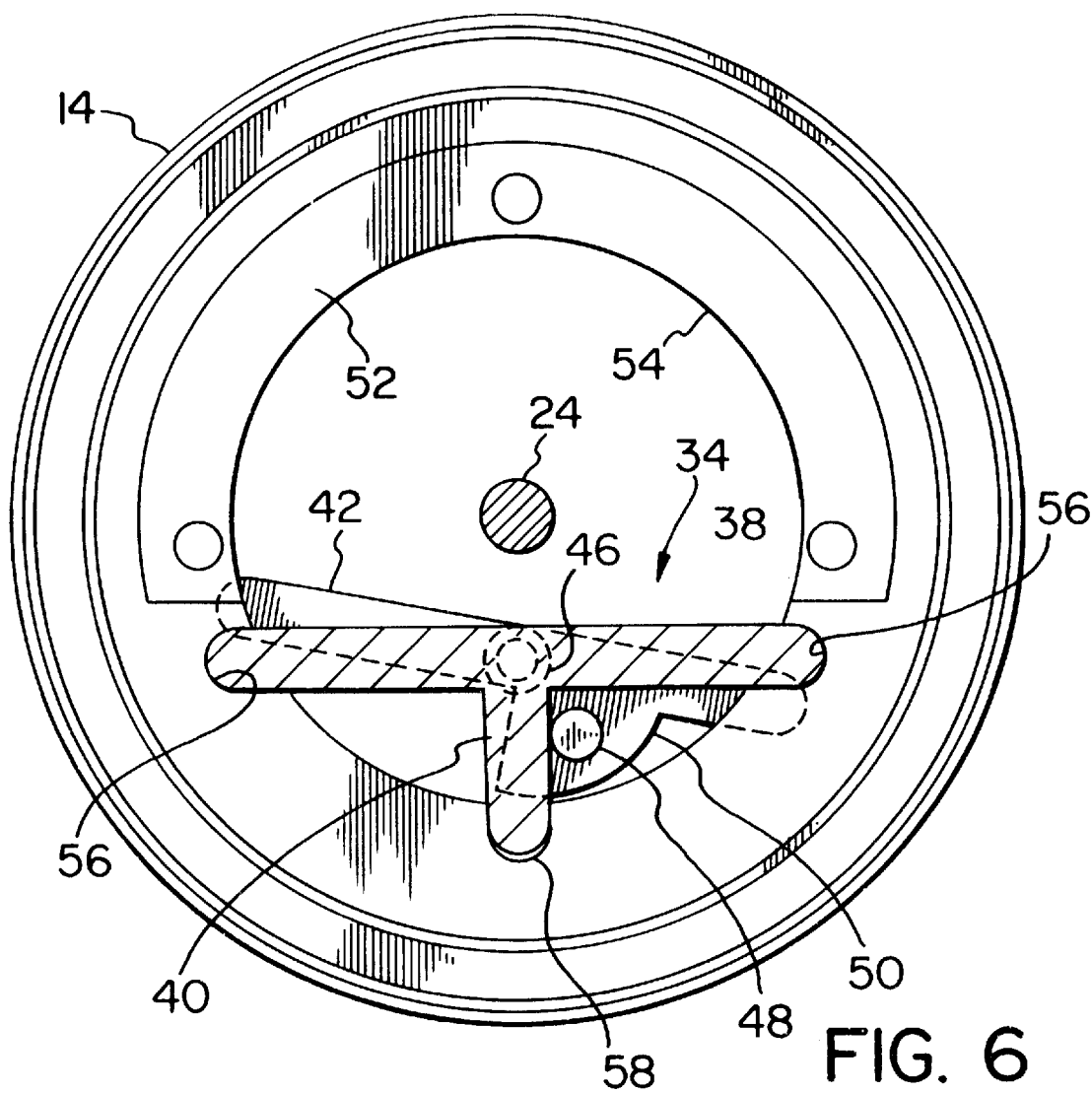
FIG. 6 is a cross-sectional view taken along line Vl—Vl in FIG. 2 and to larger scale.

As shown in FIGS. 1, 2 and 3, the movement limiting device extends between the housing parts 14 and 16 so as to extend through the wall 20 of housing part 16 and through an internal wall 52 of the housing part 14. This ensures that the latches lie at remote sides of the walls 20 and 52 in the assembled condition of the housing as shown in FIG. 1. As shown by FIGS. 6 and 8, the wall 52 has a part circular aperture 54 which at its lower extremities merges into two apertures 56 cut into the wall 54, these apertures being complementary to side edge regions of the main portion 38 of the rigid member 36. At the lower part of the aperture 54, another aperture 58 is provided into the end wall and this is complementary in shape to the lower end region of the stiffening element 40. The movement limiting device is slideably received within the apertures 56 and 58 with end regions of the main portion 38 and the stiffening element 40 received within the appropriate apertures.

Figure 7:
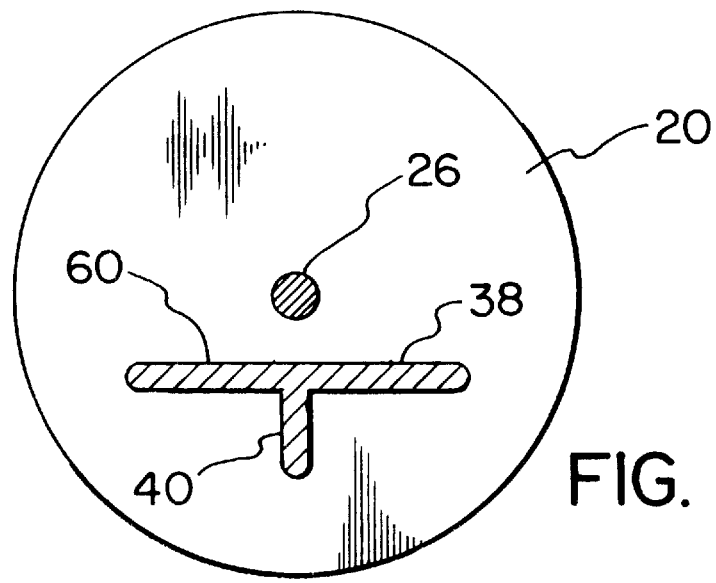
FIG. 7 is a cross-sectional view of the housing and cable assembly taken along line Vll—Vll in FIG. 1.

As shown by FIG. 7, the end wall 20 of housing part 16 is formed with a T shaped aperture 60 which is complementary in shape to the rigid member 36 which is slideably received therethrough in the assembled condition of the housing.

In use of the housing 10, with a housing part 14 and 16 completely disconnected and with the movement limiting device 34 extending through the aperture 60 in wall 20, but not into the housing part 14, the relative positions of the housing is shown, for instance, by FIG. 9. Also as shown in FIG. 9, the optical cable lengths 24 and 26 extend through the apertures 22 of the housing parts 14 and 16, respectively, with the length 24 connected to the connector part 30 and the length 26 connected to the connector part 32. To assemble the connector and the housing together, the housing parts 14 and 16 are moved axially towards each other to permit the movement limiting device 34 to be passed through the apertures 56 and 58 in the wall 52 of housing part 14. To permit this to take place, it is necessary to move the latch 42 at the respective end of the rigid member 36 pivotally until the latch is coplanar with the main portion 38. The latch then precedes the main portion 38 through the apertures 56. This then connects the housing parts 14 and 16 together by the movement limiting device as shown in FIG. 2. At this stage the connector parts 30 and 32 are not connected together and the weight of the suspended cable is taken through the housing parts 14 and 16 and through the movement limiting device 34. The movement limiting device 34 is of a material and is constructionally built to prevent significant relative rotation or change in relative orientation of the housing parts when these are separated, for instance as shown in FIG. 2. The main portion 38 is sufficiently robust to prevent torsional twisting, bending or stretching of the main portion under the load imposed by the suspended cable lengths 24 and 26 and the added weight of the housing parts 14 and 16. Hence, the movement limiting device when it is engaged with both housing parts, holds them substantially in coaxial relationship before they are directly connected together and are in the condition shown in FIG. 2.

The housing parts 14 and 16 are sufficiently spaced apart to allow for manual access to the connector parts 30 and 32. The connector parts may then be connected together to form the complete connector 12 without any danger of any bending, twisting or tensile loads being imposed upon the connector whereby damage or breakage of the connector cannot result. The state of the assembly is then as shown in FIG. 2.

The housing parts 14 and 16 are then assembled together to complete the assembly as shown by FIG. 1. The housing parts are sealed in well known manner and the cable lengths 24 and 26 are sealed within the apertures 22 whereby the environmentally protected chamber is formed housing the connector 12.

When it is desired to reach the connector 12 for maintenance or replacement purposes, the housing parts 14 and 16 are separated to the position shown in FIG. 2, the gap between them providing access to the connector to allow it to be uncoupled. During the uncoupling procedure and after separation of the housing parts, the movement limiting device 34 acts in the same way as during assembly of the housing discussed above in preventing loads being imposed upon the connector such as could cause damage or connector breakage.

The latches 42 at opposite ends of the movement limiting device 34 engage behind remote sides of the walls 20 and 52 in the normal tilted or holding positions of the latches (i.e. as shown in FIG. 6) to prevent further separation of the housing parts at this stage. By rotating the latch 42 within the housing part 14 from the tilted position shown in FIG. 6 to its position coplanar with the main portion 38 of the movement limiting device, the movement limiting device may then be slid through the apertures 56 and 58 to remove it from within the housing part 14.

Upon removal of the movement limiting device 34 from within the housing part 14, the housing and the connector are completely disassembled as shown again by FIG. 9.

As may be seen from the above embodiment, a movement limiting device in an environmental protection housing according to the invention, protects an optical fiber connector within the housing during assembly of the housing and after separation of the housing parts. The movement limiting device diverts loads in a suspended cable away from the connector while preventing torsional twisting, bending or tensile loading causing relative movement of the housing parts with them in a separated state. It is of course important to maintain the housing parts in their same relative positions during coupling and uncoupling of the connector to prevent the connector being unduly loaded.

During assembly and disassembly of the housing, the movement limiting device 34 may be removed instead through the wall 20 of the housing part 16 and inserted through the wall as the case may be, by rotating the latch 42 at that end of the movement limiting device. This is an alternative to removal through the wall 52 as described in the first embodiment. Further, with the movement limiting device slideably received within both the walls 20 and 52 and having latches 42 at its two ends, it may be removed completely from the housing parts which assists in packing and storage of the housing.

Figure 10:
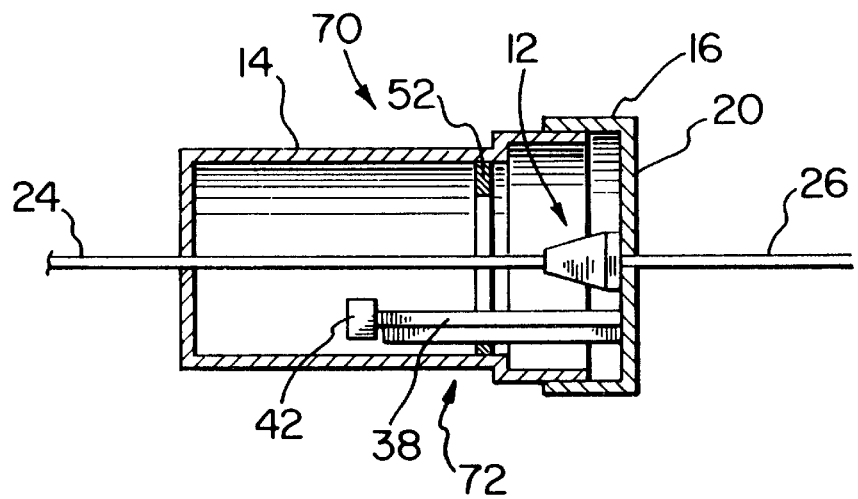
FIG. 10 is a view similar to FIG. 2 of a second embodiment.

In a second embodiment, as shown by FIG. 10, and in which parts identical with those in the first embodiment or having similar function, bear the same reference numerals, an environmental protection housing 70 is provided. This housing differs basically from the first embodiment in that it has a movement limiting device 72 having a main portion 38 as described above, but with a latch 42 only at the end of the main portion which is received through the wall 52. The other end of the main portion 38 is securely mounted to the wall 20 of the housing part 16. With this arrangement, of course, it is possible to separate the housing parts only by removal of the movement limiting device through the wall 52 as described in the first embodiment. This embodiment has an advantage that the movement limiting device 72 is contained wholly within the housing whereby no apertures are necessary for the device 72 to pass through to the exterior of the housing. Whereas care needed to be taken in the first embodiment to seal the movement limiting device 70 within the aperture 60, any problem which may have been posed by this is avoided in the second embodiment.

What is claimed is:

1. An environmental protection housing for an optical fiber connector, the housing comprising two housing parts which are connectable together to define an environmentally protected chamber to house the optical fiber connector, each housing part having an inlet into the chamber for receiving an optical fiber, and a movement limiting device comprising an elongate rigid member which, during separation of the housing parts, extends from one housing part to the other to permit partial separation of the housing parts only sufficient to enable access to the connector within the chamber to permit the connector to be uncoupled, the rigid member being capable of preventing significant relative rotation or change in relative orientation of the housing parts, the movement limiting device also comprising a release element which is operable to allow for complete separation of the housing parts.

2. A housing according to claim 1 wherein the rigid member is basically of planar elongate form and has one end region slideably receivable through an orifice in a wall of one of the housing parts, and the release element is carried by an end region of the rigid member so as to abut the wall during sliding movement of the rigid member through the wall during partial separation of the housing parts.

3. A housing according to claim 2 wherein the release element comprises a latch which is pivotally carried by the rigid member, the latch normally being urged into a holding position in which it abuts a housing part to limit the separation of the housing parts, the latch being pivotally moveable to a release position in which it allows for complete separation of the housing parts.

4. A housing according to claim 3 wherein the movement limiting device also includes a torsion spring which urges the latch into its holding position.

5. A housing according to claim 2 wherein the rigid member is slideably received in each housing part.

6. A housing according to claim 5 wherein, at each end region of the rigid member, the rigid member is slideably receivable through a complementary shaped orifice of a respective housing part, and each end region carries an individual release element.

7. A housing according to claim 6 wherein each release element comprises a latch which is pivotally carried by the rigid member, each latch normally being urged into a holding position in which it abuts its respective housing part to limit the separation of the housing parts, the latch being pivotally moveable to a release position in which it allows for complete separation of the housing parts.

8. A housing according to claim 2 wherein the rigid member has another end region which is secured to the other housing part.

9. A housing according to claim 2 wherein the rigid member has at least one elongate lateral stiffening element which extends longitudinally of the rigid member.

10. A housing according to claim 3 wherein the movement limiting device has stop means to stop pivotal movement of the latch upon reaching its release position.

* * * * *